US012413894B2

(12) United States Patent
Vilermo et al.

(10) Patent No.: US 12,413,894 B2
(45) Date of Patent: Sep. 9, 2025

(54) ESTIMATING NOISE LEVELS

(71) Applicant: Nokia Technologies Oy, Espoo (FI)

(72) Inventors: Miikka Tapani Vilermo, Siuro (FI); Sampo Vesa, Helsinki (FI); Riitta Elina Vaananen, Helsinki (FI); Jonne Juhani Makinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 184 days.

(21) Appl. No.: 18/227,364

(22) Filed: Jul. 28, 2023

(65) Prior Publication Data

US 2024/0040302 A1 Feb. 1, 2024

(30) Foreign Application Priority Data

Jul. 28, 2022 (GB) ..................................... 2211007

(51) Int. Cl.

*H04R 1/10* (2006.01)
*H04R 1/40* (2006.01)
*H04R 3/00* (2006.01)

(52) U.S. Cl.

CPC ........... *H04R 1/1083* (2013.01); *H04R 1/406* (2013.01); *H04R 3/005* (2013.01)

(58) Field of Classification Search

CPC ....... H04R 1/1083; H04R 1/406; H04R 3/005
USPC ................................................ 381/71.1, 94.1
See application file for complete search history.

(56) References Cited

U.S. PATENT DOCUMENTS 11,508,363 B2 * 11/2022 Kim .................... G10L 21/0216
2009/0323982 A1 12/2009 Solbach et al. .............. 381/94.3
2010/0061558 A1 * 3/2010 Faller ........................ H04S 7/30 381/23
2019/0259381 A1 * 8/2019 Ebenezer ............... H04R 3/005

FOREIGN PATENT DOCUMENTS

EP 2667635 A2 11/2013

OTHER PUBLICATIONS

Huang, K. et al., "TDOA Information Based VAD for Robust Speech Recognition in Directional and Diffuse Noise Field," 2012 8th International Symposium on Chinese Spoken Language Processing, 2012.

* cited by examiner

*Primary Examiner* — William A Jerez Lora
(74) *Attorney, Agent, or Firm* — McCarter & English LLP

(57) ABSTRACT

To implement some methods of attenuating noise it can be useful to obtain an accurate estimate of the noise in the microphone signals. Examples of the disclosure provide a method of accurately estimating incoherent noise levels. In examples of the disclosure a primary estimation of a noise amount is made. The primary estimation of a noise amount is used to determine a direction parameter and a diffuseness parameter. The determined direction parameter and the estimated diffuseness parameter are used to estimate a predicted level difference between a first microphone signal and a second microphone signal. A level difference between the first microphone signal and the second microphone signal is determined and a noise level is estimated using at least the determined level difference and the predicted level difference.

20 Claims, 6 Drawing Sheets

ESTIMATING NOISE LEVELS

TECHNOLOGICAL FIELD

Examples of the disclosure relate to estimating noise levels. Some relate to estimating levels of incoherent noise such as wind noise.

BACKGROUND

Noise such as wind noise or other types of incoherent noise can be problematic in sound recordings. Effective methods of estimating noise levels can be used to control noise levels.

BRIEF SUMMARY

According to various, but not necessarily all, examples of the disclosure there is provided an apparatus comprising means for:

making a primary estimation of a noise amount;

using at least the primary estimation of a noise amount to determine a direction parameter and a diffuseness parameter;

using the determined direction parameter and diffuseness parameter to estimate a predicted level difference between a first microphone signal and a second microphone signal;

determining a level difference between the first microphone signal and the second microphone signal; and estimating a noise level using at least the determined level difference and the predicted level difference.

Using at least the primary estimation of a noise amount to determine a direction parameter and a diffuseness parameter may comprise selecting a process to use for determining the direction parameter and the diffuseness parameter.

The means may be for estimating the direction parameter and the diffuseness parameter if the primary estimation of a noise amount is below a lower threshold.

The means may be for estimating the direction parameter and using a recent estimation of the diffuseness parameter if the primary estimation of a noise amount is above a lower threshold but below an upper threshold.

The means may be for using a predetermined direction parameter and a recent estimation of the diffuseness parameter if the primary estimation of a noise amount is above an upper threshold.

The predetermined direction may be determined based upon a use case of a device comprising the microphones.

The means may be for using information relating to a reference noise level for a device comprising the microphones to determine the predicted level difference.

The noise level may be estimated by adjusting a microphone signal level based on the determined level difference and comparing the adjusted microphone signal level to one or more other microphone signal levels.

The diffuseness parameter may comprise a ratio of direct audio and ambient audio.

The means may be for reducing noise levels within microphone signals based on the estimated noise levels.

The noise may comprise incoherent noise.

According to various, but not necessarily all, examples of the disclosure there is provided a device comprising an apparatus as described herein wherein the device comprises two or more microphones.

The device may be one of: a handheld electronic device, a headset, a face covering.

According to various, but not necessarily all, examples of the disclosure there is provided a method comprising:

making a primary estimation of a noise amount;

using at least the primary estimation of a noise amount to determine a direction parameter and a diffuseness parameter;

using the determined direction parameter and diffuseness parameter to estimate a predicted level difference between a first microphone signal and a second microphone signal;

determining a level difference between the first microphone signal and the second microphone signal; and estimating a noise level using at least the determined level difference and the predicted level difference.

According to various, but not necessarily all, examples of the disclosure there is provided a computer program comprising computer program instructions that, when executed by processing circuitry, cause:

making a primary estimation of a noise amount;

using at least the primary estimation of a noise amount to determine a direction parameter and a diffuseness parameter;

using the determined direction parameter and diffuseness parameter to estimate a predicted level difference between a first microphone signal and a second microphone signal;

determining a level difference between the first microphone signal and the second microphone signal; and estimating a noise level using at least the determined level difference and the predicted level difference.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1A:
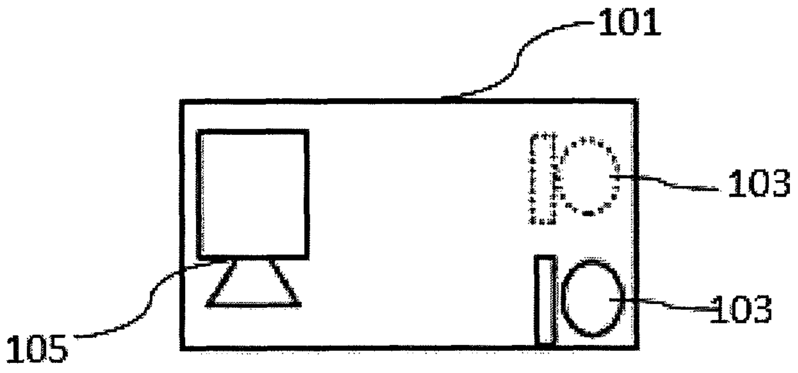
FIGS. 1A to 1D show example devices.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

Noise such as wind noise or other types of incoherent noise can be problematic in sound recordings. Methods of attenuating noise are known. To implement some methods of attenuating noise it can be useful to obtain an accurate estimate of the noise in the microphone signals. Examples of the disclosure provide a method of accurately estimating incoherent noise levels.

The noise that is estimated in examples of the disclosure can be incoherent noise. The incoherent noise can vary rapidly as a function of time, frequency range and location. This can mean that if a first microphone is detecting significant amounts of incoherent noise, a different microphone in a different location might not be detecting very much incoherent noise. The microphone that is detecting the most noise can vary over time. As incoherent noise affects different microphone signals differently it is possible that if one microphone signal contains high levels of such noise a different microphone in the same device could still have low noise levels.

The incoherent noise levels could be caused by wind, handling noised caused by something touching one microphone and not other microphones (for example, a mask) or any other suitable type of noise.

FIGS. 1A to 1D show example devices 101 that can be affected by incoherent noise.

In the example of FIG. 1A the device 101 is a mobile phone. The mobile phone comprises at least two microphones 103 and a camera 105. The mobile phone could comprise other numbers of microphones 103 in other examples.

In the example of FIG. 1A one of the microphones 103 is provided on the same side of the device 101 as the camera 105 and one of the microphones 103 is provided on the opposite side of the device 101 to the camera 105. This is indicated by the dashed lines in FIG. 1A.

Having the microphones 103 on opposite sides of the device 101 can lead to acoustic effects such as shadowing. Shadowing arises when different microphones 103 are on different sides of the device 101 to a sound source. Microphones 103 that are on the same side of the device 101 as a sound source have higher signal levels (that is, they will be louder) than the microphones 103 that are on the opposite side of the device 101 to the sound source. This acoustic effect is bigger at higher frequencies.

Figure 1B:
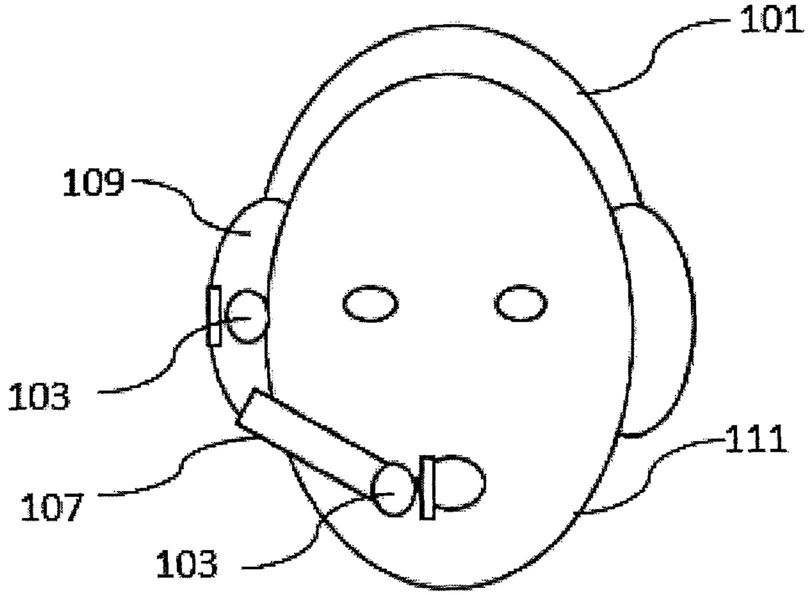

In the example of FIG. 1B the device 101 is headphones. The headphones also comprise two microphones 103. In this example one of the microphones 103 is located on a boom 107 and one of the microphones 103 is located on a cup 109 of the headphones. When the headphones are worn by a user 111 the microphone 103 on the boom 107 is located close to the mouth of the user 111 but the microphone 103 on the cup 109 is located close to the user's ear. This will mean that signal levels due to the user 111 talking or other sounds coming from the user's mouth will be higher for the microphone 103 on the boom 107 than for the microphone 103 on the cup 109.

Figure 1C:
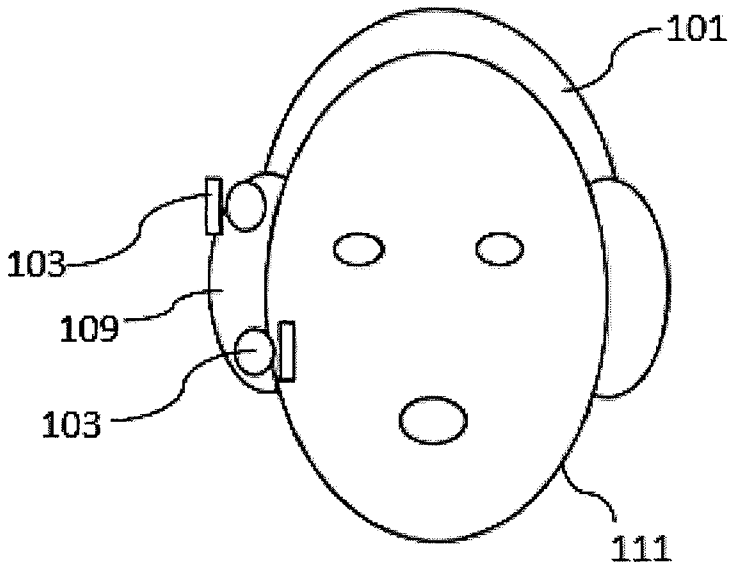

In the example of FIG. 1C the device 101 is another set of headphones. The headphones in this example also comprise two microphones 103. In this example both of the microphones 103 are located on a cup 109 of the headphones. The microphones 103 are located on the cup 109 so that, when the user 111 is wearing the headphones one of the microphones 103 is closer to the user's mouth than the other microphone is. This will mean that signal levels due to the user 111 talking or other sounds coming from the user's mouth will be higher for the microphone 103 that is closest to the user's mouth.

Figure 1D:
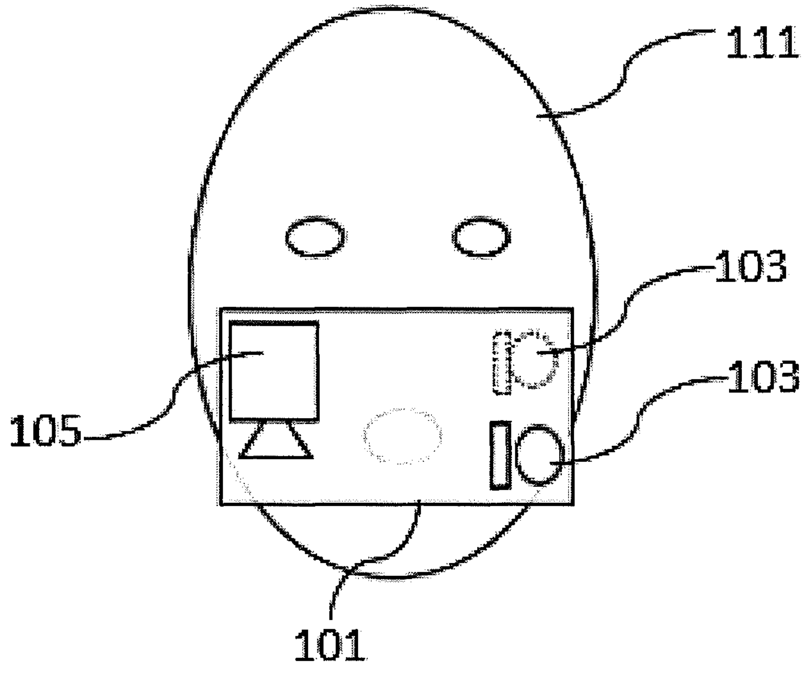

In the example of FIG. 1D the device 101 is a mask with a first microphone 103 inside the mask and a second microphone 103 outside of the mask. This means that, when a user 111 is wearing the mask the first microphone 103 is closer to the user's mouth than the second microphones 103 is. This will mean that signal levels due to the user 111 talking or other sounds coming from the user's mouth will be higher for the microphone 103 that is positioned inside of the mask than for the microphone 103 on the outside of the mask.

In the example of FIG. 1D the device 101 also comprises a camera 105. The respective devices 101 could comprise other comprise other components that are not shown in FIGS. 1A to 1D. For example, the devices 101 could comprise loudspeakers for playing back audio for the user 111.

Other types of devices 101 could be used in other examples.

In examples of the disclosure any one or more of the microphones 103 in the devices 101 can be affected by incoherent noise. The incoherent noise could be wind noise, handling noise or any other suitable type of noise. In examples where the device 101 comprises microphones 103 that can be positioned close to a user's mouth the incoherent noise could comprise wind noise from the air and/or from the user 111 breathing.

The physical characteristics of the example devices 101 result in different signal levels for the different microphones in dependence upon the relative locations of the microphones 103 and the sound source. For example, the relative locations of the microphones 103 can lead to a first microphone having a higher signal level than a second microphone 103 due the to the position of the sound source relative to the microphones 103. In examples of the disclosure the signal level difference caused by these physical characteristics can be taken into account when noise levels are being estimated. For example, effects such as shadowing, the presence of a mask, the different distances between the microphones 103 and the sound source, or any other relevant factors can be accounted for.

Figure 2:
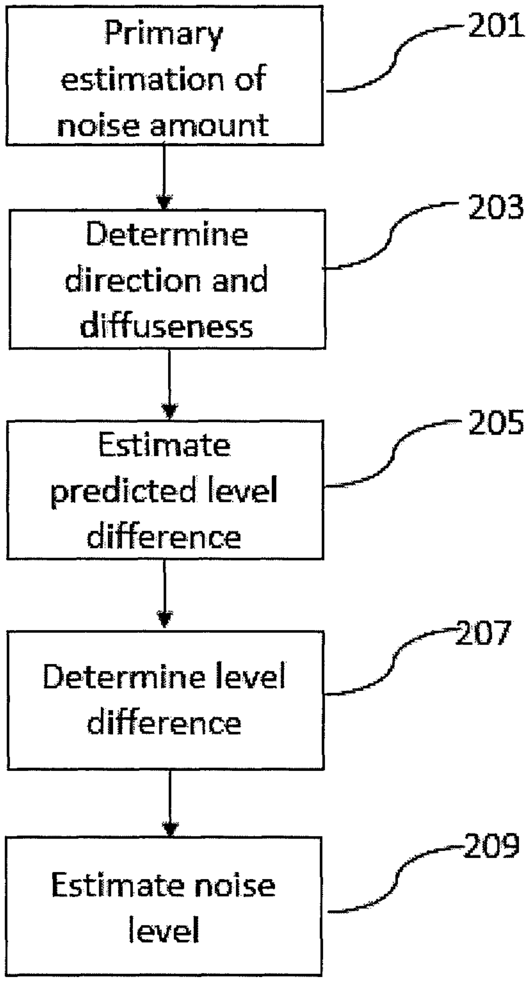
FIG. 2 shows an example method.

FIG. 2 shows an example method of estimating a noise level. The method could be implemented using any suitable device 101 or apparatus.

At block 201 the method comprises making a primary estimation of a noise amount. The noise amount can be the amount of noise in microphone signals captured by two or more microphones 103. The two or more microphones 103 could be part of a device 101 as shown in FIGS. 1A to 1D or could be part of any other suitable device 101 that comprises two or more microphones 103.

In some examples the noise comprises incoherent noise. The incoherent noise could be wind noise, handling noise, noise caused by a user 111 wearing masks, or noise caused by any other phenomenon or combinations of phenomena.

Any suitable method could be used to make the primary estimation of a noise amount. The primary estimation of the noise amount could be made by using the signal levels of the microphone signals. These signals would not be adjusted before being used to make the primary estimation of the noise amount.

At block 203 the method comprises using at least the primary estimation of the noise amount to determine a direction parameter and a diffuseness parameter.

The direction parameter can provide an indication of the direction of the sound sources within the sound field captured by the microphones.

The diffuseness parameter can provide an indication of how localised or non-localised the sound is. In some examples the diffuseness parameter can provide an indication of the levels of ambient noise in the sound field. In some examples the diffuseness parameter can comprise a ratio of direct audio and ambient audio. In such cases a low diffuseness parameter can indicate that the sound is mainly directional and is not very diffuse, that is there are low levels of ambient noise. Conversely a high diffuseness parameter can indicate that the sound is mainly ambient and is not very direction, that is there are high levels of ambient noise.

In some examples the primary estimation of the noise amount can be used to select a process for determining the direction parameter and the diffuseness parameter. Different methods can be appropriate for different estimated noise amounts. This can take into account that diffuseness can be difficult to measure accurately unless the noise amount is low and that the direction of the sound source can also be difficult to estimate accurately if the noise amount is high. Once a process has been selected based on the noise amount this selected process can be used to determine a direction parameter and a diffuseness parameter and/or any other suitable information.

As an example, if the primary estimation of the noise amount is below a lower threshold it can be assumed that the noise amount is low. In such cases the direction parameter and the diffuseness parameter could be estimated because it is expected that the noise would have little effect on these estimations. In such cases the obtained estimation of both a directional parameter and a diffuseness parameter would be sufficiently accurate.

If the primary estimation of the noise amount is above a lower threshold but below an upper threshold it can be assumed that the noise amount is medium. In such cases the direction parameter can still be reliably estimated because it can be expected that the medium noise amount would have little effect on the estimation of the direction parameter. However, the medium noise amount would adversely affect the reliability of an estimation of the diffuseness parameter so an alternative method of obtaining the diffuseness parameter can be used. In some examples the alternative method of determining the diffuseness parameter could be to use a recent estimation of the diffuseness parameter. The recent estimation of the diffuseness parameter can have been obtained when the noise amount was below the lower threshold. The recent estimation can be stored in a memory or other storage means and retrieved for used when the noise amount is above the lower threshold.

If the primary estimation of the noise amount is above the upper threshold it can be assumed that the noise amount is high. In such cases it could be assumed that the noise amount would adversely affect the reliability of an estimation of both the direction parameter and the diffuseness parameter. In such cases an alternative method can be used to obtain both the direction parameter and the diffuseness parameter. For instance, a predetermined direction parameter could be used and a recent estimation of the diffuseness parameter could be used. The recent estimation could be obtained during a time interval where the noise amount was low.

Any suitable method could be used to determine the predetermined direction parameter. In some examples the predetermined direction parameter could be predetermined based on a use case of the device 101. For instance, if the device 101 is a mobile device such as a phone being used to make a video call it can be assumed that the person talking is in the field of view of the camera. Therefore, it could be assumed that the user is holding the device 101 in front of their face. This information could be used to estimate a direction parameter.

If the device 101 is headphones the direction of the sound source can be predicted from the relative position of the user's mouth relative to the microphones 103 within the headphones.

In some examples the device 101 could comprise a plurality of cameras 105. Information indicative of the camera currently in use could be used to infer the location of a sound source and from that directional information could be estimated.

In some examples the direction of the most important sound sources can be determined. The most important sound source could be dependent upon the use case of the device 101. In some examples the most important sound source could be assumed to be a user talking. In some examples the most important sound source could be assumed to be within a field of view of a camera. Other methods for determining a most important sound source could be used in examples of the disclosure.

Sound sources that are not considered to be the most important sound sources can be attenuated as part of the noise attenuation or noise control processes. This means that it is not so important to determine how incoherent noise affects the capture of sound sources that not considered to be the most important sound sources.

At block 205 the method comprises using the determined direction parameter and the estimated diffuseness parameter to estimate a predicted level difference between a first microphone signal and a second microphone signal. The first microphone signal is captured by a first microphone 103 and the second microphone signals is captured by a second microphone 103. The first microphone 103 and the second microphone can be part of the same device 101.

The predicted level difference can give an indication of the level differences that would be expected to arise due to the physical characteristics of the device 101 and/or any other relevant factors. The predicted level differences can take into account factors such as whether or not a microphone 103 is on the same side of a device 101 as the sound source, a difference in distances between the sound source and the respective microphones 103, any physical barrier between the sound source and the respective microphones 103, and/or any other relevant physical characteristics.

The predicted level difference can give an indication of the level difference that would be expected if there is no incoherent noise in the respective microphone signals. This can take into account the expected level difference due to shadowing or other effects.

The predicted level difference can be determined using information relating to a reference noise level for a device 101 comprising the microphones 103. The reference noise level can be obtained from measurements made in controlled acoustic environments and/or from simulations of the device 101 in controlled acoustic environments. The measurements or simulations can provide indications of the expected level differences that would occur for sound from a plurality of given directions and for a given level of diffuseness. The results of the measurements can be used, and/or adapted for use, as the predicted level differences.

At block 207 the method comprises determining a level difference between the first microphone signal and the second microphone signal. The determined level difference is the actual level difference as detected by the respective microphones 103. The actual level difference includes the effect of incoherent noise such as wind noise. The actual level difference takes into account the effects of physical characteristics such as shadowing.

In some examples the effects of physical characteristics such as shadowing can be accounted for by adjusting one or more of the microphone signal levels before the level difference is determined. For example, the signal level of the quietest microphone could be amplified by a factor determined by the predicted level difference.

At block 209 the method comprises estimating a noise level using at least the determined level difference and the predicted level difference. The noise level can be estimated using any suitable process. In some examples the noise level can be estimated by adjusting a microphone signal level based on the determined level difference and comparing the adjusted microphone signal level to one or more other microphone signal levels.

Incoherent noise such as wind noise typically causes the microphone signal level to increase. In some cases the noise can cause saturation of the microphone signal levels. Incoherent noise such as wind noise affects different microphones 103 in different locations differently. This means that the level increase from wind noise in different microphone signals is different and therefore the presence of incoherent noise can be determined from microphone signal level differences.

Examples of the disclosure give a more accurate indication of the noise level compared to the initial primary estimation of the noise amount. Accounting for the microphone signal level differences caused by the physical characteristics of the device 101 enables the microphone signal level difference due to the incoherent noise to be determined.

This more accurate indication of the noise level can be used to for reducing noise levels within the microphone signals and/or for any other suitable purpose.

Any suitable process can be used for reducing noise using the estimated noise level. For instance, in some examples the process could comprise only using the microphone signals with the lowest noise levels, attenuating the noise from the loudest microphone signals and/or using any other suitable means. The attenuating of the noise can be frequency specific so that different filters and/or processes can be used at different frequency ranges.

Figure 3:
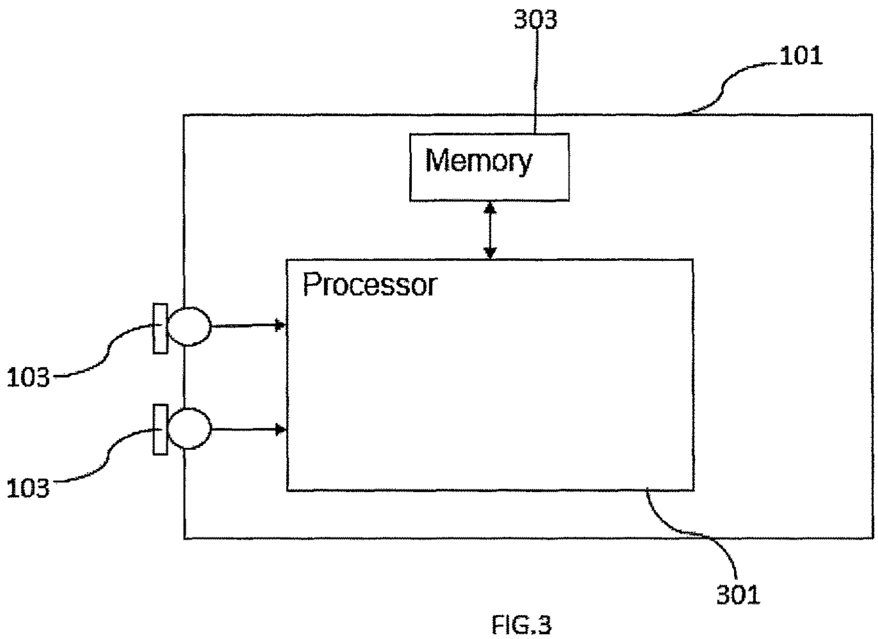
FIG. 3 shows an example device.

FIG. 3 schematically shows an example device 101 that could be used to implement examples of the disclosure.

The device 101 comprises two microphones 103, a processor 301 and a memory 303. Only components of the device 101 that are referred to in this description are shown in FIG. 3. The device 101 could comprise other components that are not shown in FIG. 3. For example, the device 101 could comprise loudspeakers, power sources, user interface and/or any other suitable components.

The device 101 could be any device 101 that comprises two or more microphones 103. For example, the device 101 could be a mobile phone, a table computer, headphones or any other suitable type of device 101.

In the example of FIG. 3 the device 101 comprises two microphone 103. In other examples the device 101 could comprise more than two microphones 103. In the example of FIG. 3 the microphones 103 are indicated as being adjacent to each other however the microphones 103 can be located in any suitable locations on the device 101.

The microphones 103 can comprise means for detecting an acoustic signal and converting the detected acoustic signal into an electric microphone signal representative of the acoustic signal. The device 101 is configured so that the microphone signals are provided as inputs to the processor 301. The microphone signals can be processed to determine the noise levels within the microphone signals. The processor 301 can be configured to perform methods such as those shown in FIGS. 2 and 4 to enable the noise level to be determined.

The processor 301 is configured to read from and write to the memory 303. Examples of a processor 301 and a memory 303 are shown in more detail in FIG. 6.

Figure 4:
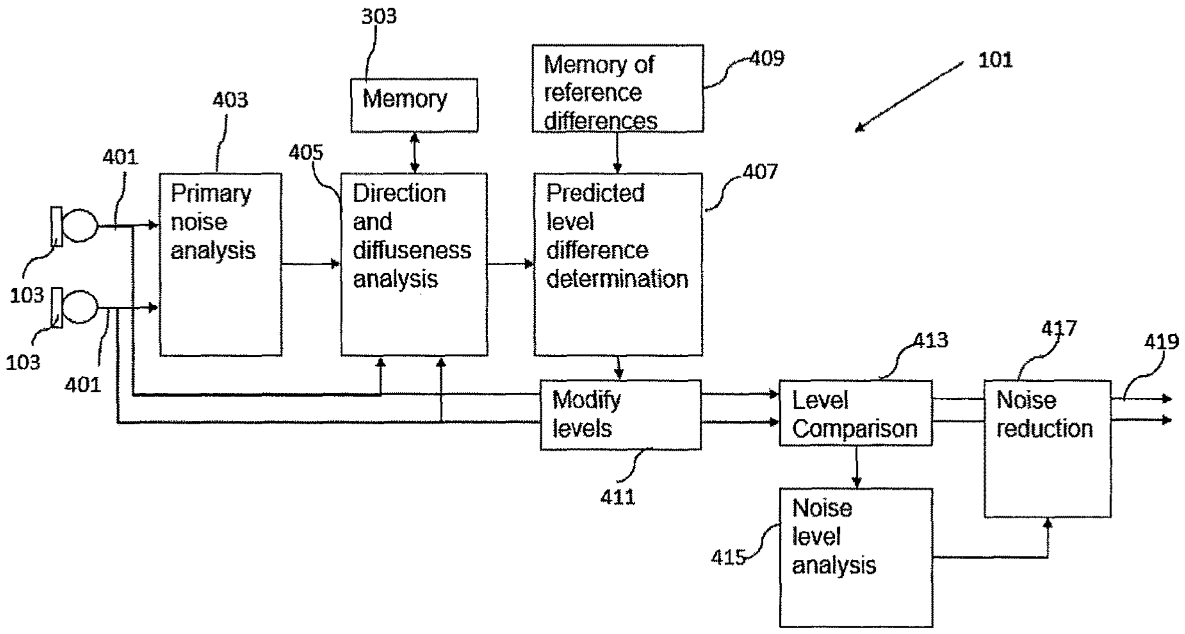
FIG. 4 shows an example device.

FIG. 4 schematically shows an example device 101. FIG. 4 shows functional modules of a device 101. The functional modules can be provided by the processor 301 and memory 303 and/or by any other suitable means.

In the example of FIG. 4 the device 101 comprises a plurality of microphones 103. Two microphones 103 are shown in FIG. 4 but more than two microphones 103 could be used in other examples of the disclosure. The microphones 103 can be located in any suitable locations within the device 101.

The microphones 103 provide microphone signals 401 as inputs. The respective microphones 103 provide respective microphone signals 401. Physical characteristics of the device 101, such as the location of the microphones 103 relative to each other, can affect the signal levels of the microphone signals 401.

The microphone signals 401 are provided to a primary noise analysis block 403. The primary noise analysis block 403 is configured to use the microphone signals 401 to make a primary estimation of a noise amount. Any suitable process can be used to make the primary estimation of the noise amount. The process used to make the primary estimation of the noise amount might not be highly accurate.

In some examples the primary estimation of the noise amount can categorize the noise amount. For instance, it can categorize whether the noise amount is high, medium or low. Any suitable thresholds can be used for the boundaries between the respective categories. In some examples there could be a different number of categories for the noise amount.

In some examples the primary estimation of the noise amount can be estimated based on a level difference between respective microphone signals 401. In such cases level difference below 7 dB can be categorized a low noise amount, a level difference between 7 to 15 dB cab categorized as a high noise amount and a level difference above 15 dB can be categorized as a high noise amount. Other methods for determining the noise amount and/or boundaries for the categories can be used in other examples of the disclosure.

The primary noise analysis module 403 provides an output to the direction and diffuseness analysis module 405. The output of the primary noise analysis module 403 can comprise an indication of the primary estimation of the noise amount. In some examples the output of the primary noise analysis module 403 can provide an indication of the category of the noise amount. That is, whether the noise amount is high, medium, low or in any other suitable category.

The direction and diffuseness analysis module 405 receives the indication of the primary estimation of the noise amount and the microphone signals 401 as inputs. The direction and diffuseness analysis module 405 uses the microphone signals 401 to determine a direction parameter and a diffuseness parameter. The primary estimation of the noise amount is used to determine the direction parameter and the diffuseness parameters. In some examples the primary estimation of the noise amount is used to select the process for determining the direction parameter and the diffuseness parameters.

The direction and diffuseness analysis module 405 is also configured to write to and read from the memory 303. This can enable parameters such as the direction parameter and/or the diffuseness parameter to be stored in the memory 303. This can enable parameters determined by the direction and diffuseness analysis module 405 to be stored in the memory 303 and retrieved for use at a later point. This can enable recent estimates of the direction parameter and/or the diffuseness parameter to be used when current estimates are not available and/or for any other suitable purpose.

The direction parameter and the diffuseness parameter give information about the spatial characteristics of the sound field captured by the microphones 103. The direction parameter gives information indicating the direction of the sound source relative to the microphones 103. The diffuseness parameter gives an indication of how localized or non-localized sound is. This can give an indication of the level of ambient sound in the sound field.

Any suitable process or method can be used to determine the direction parameter and the diffuseness parameter. Different methods can be used to determine the direction parameter and the diffuseness parameter based on the primary estimation of the noise amount in the microphone signal 401.

The direction parameter and the diffuseness parameter are provided to the predicted level difference determination block 407. The predicted level difference determination block 407 is configured to use the direction parameter and the diffuseness parameter to determine a level difference that would be expected for the respective microphone signals 401 in the absence of any incoherent noise. For instance, this can estimate the level difference that could be predicted due to shadowing or other effects caused by the relative positions of the respective microphones 103 or any other relevant factors.

The predicted level difference determination module 407 can be configured to access a memory of reference differences 409. The memory of reference differences 409 can be stored in the memory 303 of the device 101 and/or can be stored in any other suitable location. The memory of reference differences 409 can comprise a look up table or other record indicating the expected level differences for the microphones 103 capturing sound fields having specified spatial characteristics. That is the, look up table can comprise an indication of the level differences that would be expected between respective pairs of microphones 103 for given values of direction parameter and given values of diffuseness parameter. The predicted level difference determination block 407 can determine the predicted level difference by finding the corresponding level difference for the current direction parameter and the diffuseness parameter in the look up table.

The values for the level differences that are stored in the memory of reference differences 409 can be obtained through experimental measurements made using the device 101 or a similar device 101 in controlled acoustic conditions. In some examples the values for the level differences stored in the memory of reference differences 409 could be obtained from simulations of the device 101 in a controlled acoustic environment.

The predicted level difference is provided from the predicted level difference determination module 407 to the modify level module 111. The modify level module 111 is configured to adjust one or more of the signal levels of the microphone signals 401 to account for the differences in microphone signal 401 levels due to the physical characteristics such as shadowing or other effects. The adjustment can remove or mitigate the effect of these physical characteristics in the relative microphone signal 401 levels.

The adjusted microphone signal levels are provided to a level comparison module 413. The level comparison module 413 is configured to compare the levels of respective pairs of microphone signals 401. The level comparison module 413 can provide an indication of the level differences between respective pairs of microphone signals 401 as an output.

The indication of the level differences is provided as an input to a noise level analysis module 415. The noise level analysis module 415 can use the level differences determined by the level comparison module 413 to make an accurate estimation of the noise levels in the microphone signals 401. The noise level estimation is more accurate than the primary estimation of the noise amount because the level differences due to the physical characteristics of the device 101 comprising the microphones 101 can be taken into account. The noise level analysis module 415 can use any suitable process to determine the noise level.

The noise level analysis module 415 provides an indication of the noise level as an output. The indication of the noise level and the microphone signals 401 are provided as inputs to a noise reduction module 417. The noise reduction module 417 can apply any suitable method or process to reduce noise in the microphone signals 401. The noise reduction method could comprise only using the microphone signals 401 with the lowest noise levels, attenuating noise within the noisiest microphone signals and/or any other suitable process.

The noise reduction module 417 provides a noise reduced signal 419 as an output. The noise reduced signal can be used for any suitable purposes. For example, it could be encoded for transmission to another device and/or could be stored in the memory 303 of the device 101 for later use and/or could be used for any other suitable purpose.

Variations of the device 101 could be used in examples of the disclosure. For instance, the modules could be combined or modified as appropriate. In some examples different devices 101 could comprise one or more of the modules.

Figure 5:
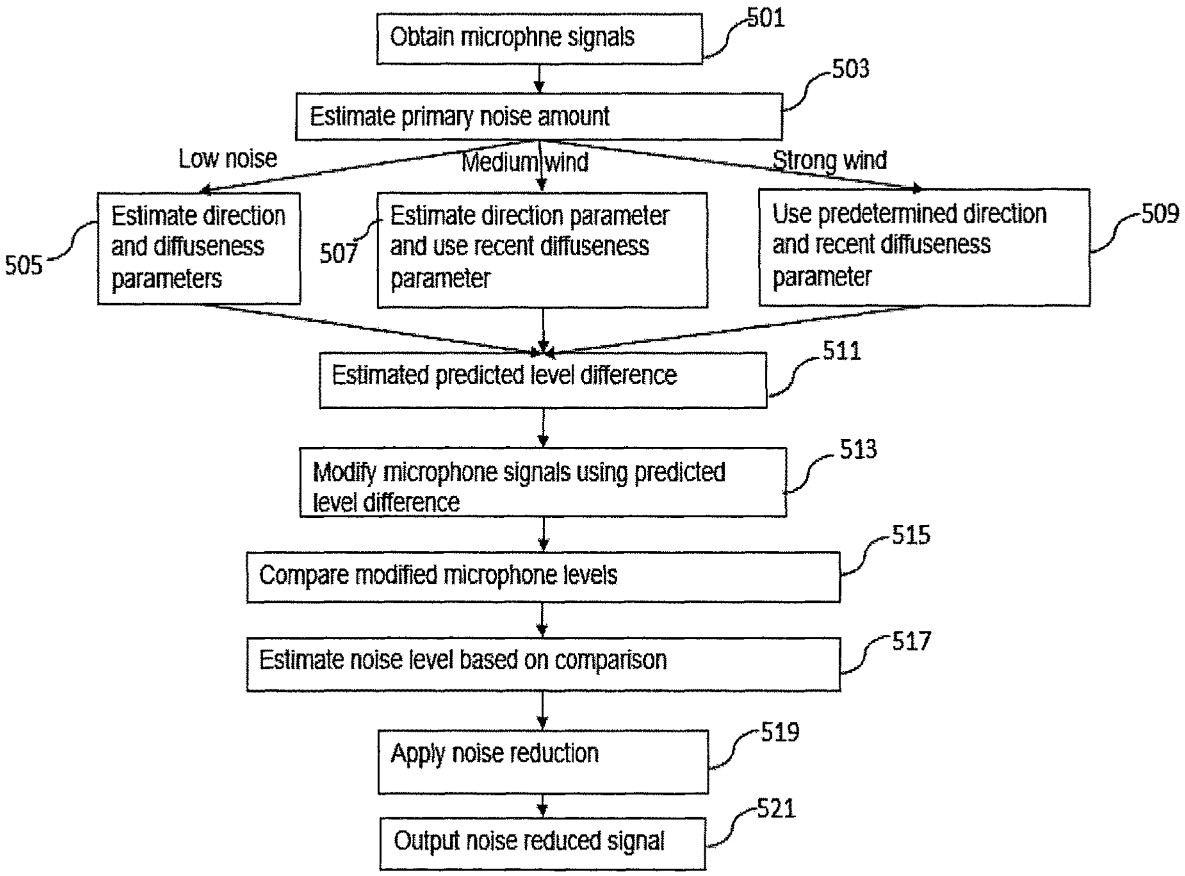
FIG. 5 shows an example method.

FIG. 5 shows an example method for estimating noise levels according to examples of the disclosure. The method could be implemented using devices 101 such as the devices shown in FIGS. 1A to 1D, and/or FIGS. 3 to 4.

At block 501 the method comprises obtaining microphone signals 401. The microphone signals 401 can be obtained from microphones 103 that are located in or on the same device 101. In the example of FIG. 5 two microphone signals 401 are obtained. In some examples more than two microphone signals 401 could be obtained.

The microphone signals 401 can be processed in small time-frequency tiles. The small time-frequency tiles can be obtained by framing the microphone signals in time frames of given length. In some examples the time frames could be 20 ms in duration. Other lengths can be used for the time frames in other examples. The time frames can then be transformed into the frequency domain using any suitable transformation. In some examples the time frames can be transformed to the frequency domain using filter banks such as Fast Fourier Transform (FFT), Modified Discrete Cosine Transform (MDCT), Discrete Cosine Transform (DCT), and/or any other suitable type of filterbank. The framed bands of audio are referred to as time-frequency tiles. Other processes and means for creating similar types of tiles can be used in various implementations of the disclosure. Once the processing of the microphone signals 401 has been completed the frequency signals can be converted back into the time domain. The process that is used for converting the frequency signal back into the time domain can comprise a corresponding transformation to the transformation used to convert the microphone signals 401 into the frequency domain.

At block 503 a primary estimation of a noise amount in the microphone signals 401 is made. Any suitable process can be used to make the primary estimation of the noise amount. For instance, the relative levels of the respective microphone signals 401 can be compared. In examples of the disclosure the noise amounts that are estimated are incoherent noise. The incoherent noise can be noise that varies rapidly over time and location so that it causes level differences between the respective microphone signals 401. In some examples the noise could be wind noise, handling noise or any other suitable type of noise.

The primary estimation of the noise amount is used to select a process for determining spatial characteristics such as a direction parameter and a diffuseness parameter. The estimation of a direction parameter is relatively robust in the presence of incoherent noise especially if the estimation of the direction is made using phase differences between microphone signals. This can enable direction parameters to be estimated in both low noise levels and medium noise levels but not for high noise levels.

The estimation of a diffuseness parameter is not as robust in the presence of incoherent noise as the estimation of a direction parameter. Incoherent noise such as wind noise makes the microphone signals 401 uncorrelated and the estimation of the diffuseness parameter is based on correlation calculation. Therefore, the diffuseness parameters would only be estimated for low noise levels but not for medium or high noise levels.

In the example of FIG. 5 the estimation of the primary noise amount categorises the noise amount into three categories. If the noise amount is below a lower threshold the noise amount can be assumed to be low. If the noise amount is above the lower threshold but below a higher threshold the noise amount can be assumed to be medium. If the noise amount is above the higher threshold the noise amount can be assumed to be high. The thresholds that are used for the respective categories can be determined based on the positions of the microphones 103 within the device 101, how the microphones 103 are integrated into the device 101, the shape of the device 101, and/or any other suitable factor. In examples where the noise is wind noise low wind noise conditions could be 0-3 m/s wind, medium wind noise conditions could be 3-6 m/s wind and high wind noise conditions could be >6 m/s. Other values for the thresholds could be used in other examples. In some examples there could be more than three categories for the noise amounts and the respective thresholds could take that into account.

If it is estimated that the noise amount is low then at block 505 the direction parameter is estimated and the diffuseness parameter is also estimated. Any suitable process can be used to estimate the direction and the diffuseness parameters.

If it is estimated that the noise amount is medium then at block 507 the direction parameter is estimated and a recent estimate of the diffuseness parameter is used. The recent estimate of the diffuseness parameter can be one that is obtained during a time period when the noise amount is low. This method of determining the diffuseness parameter can be sufficiently accurate because diffuseness tends to change slowly over time compared to the direction so that comparatively old estimates of the diffuseness parameter can be used. As an alternative or addition, in some examples the diffuseness parameter could be estimated from microphone signals 401 obtained by a different pair of microphones 103 within the device 101. The use of different microphone signals 401 might be appropriate if the different microphone signals 401 have low noise amounts. Other processes and/or combinations of processes for determining the diffuseness parameter could be used in other examples.

If it is estimated that the noise amount is high then at block 509 a predetermined direction is used for the direction parameter. The predetermined direction parameter can be predetermined based on a current use case of the device 101 or any other suitable factor. For instance, if the device 101 is a mobile phone being used for a video call it can be assumed that the most important sound source will be the user 111 speaking and that the user 111 will be in the field of view of the camera 105. Therefore, the positions of the camera 105 can be used to infer the direction of the sound source. As another example, if the device 101 is being used to film video content then it can be assumed that the important sound source is also in the field of view of the camera 105. If the device 101 is being used to make a voice call it can be assumed that the device 101 is positioned close to the user's head and that the most important sound source will be the user 111 talking. If the device 101 is headphones then it can be assumed that the most important sound source is likely to be the user 111 talking and the relative position of the user's mouth with respect to the microphones 103 can be predetermined based on the geometry of the headphones. Other examples for estimating a predetermined direction for an important sound source can be used in other examples of the disclosure. The sound sources that are not the most important sound sources can be ignored because the noise reduction or noise control processes will be mainly applied to the most important sound sources.

The methods for determining the diffuseness parameter at a high noise level can be the same, or similar, as those used for the methods for determining the diffuseness parameter at the medium noise levels.

The following tables sets out methods that can be used to estimate the direction parameter and the diffuseness parameter in different noise conditions. Other methods and conditions for using the methods could be used in examples of the disclosure.

| | Direction Parameter | Diffuseness Parameter |
|---|---|---|
| Low noise | Estimate direction normally | Estimate diffusenes normally |
| Medium noise | Estimate direction normally | Use earlier diffuseness estimate |
| High noise | Use pre-determined direction | Use earlier diffuseness estimate |

Once the direction parameter and the diffuseness parameter have been determined the respective parameters can be used to estimate a predicted level difference for the microphone signals 401 for the spatial characteristics of the current sound field.

In some examples a reference level difference can be used to estimate the predicted level difference. The reference level difference can be obtained from measurements made using the device 101, or a similar device 101, or a simulation of the device 101 in a controlled acoustic environment. For example, the measurements could be obtained by placing the device 101 (or a similar device 101) in an anechoic, wind noise free environment and playing sound from a range of given directions around the device 101. The level differences that occur when the sound is coming from the different directions can be measured and the measurements can be stored in a suitable location so that they can be referred to by the device 101 as appropriate.

In some examples of the disclosure the predicted level difference can be obtained by obtaining a reference level difference for a direction corresponding to the estimated direction and then multiplying the reference level by the diffuseness parameter. For instance, the diffuseness parameter could be a ratio of direct sound to ambient sound. The direct/ambient ratio is zero if the microphone signal is fully ambient. This would indicate that the sound comes equally from all directions. The direct/ambient ratio is one if the microphone signal 401 is fully directional. This would indicate that the sound only comes from a single direction.

$$\text{predicted acoustic level difference between mics } (i, j) = \frac{D}{A}\text{ratio} * \text{reference acoustic level difference for direction } (\alpha) \text{ and mics } (i, j)$$

Once the predicted level difference has been obtained, at block 513, the microphone signal levels are modified using the predicted level difference. In this case the microphone signal 401 that should be quieter (have the lower level) according to the predicted microphone levels can be amplified by the predicted difference in the levels. This can remove the effects of physical characteristics such as shadowing in the respective microphone signal levels.

Once the microphone signal level has been adjusted then, at block 515, the adjusted microphone signals are compared. The comparison indicates the level differences between the respective microphone signals 401 that is caused by the incoherent noise. The level difference can be calculated as the energy difference between the microphone signals 401.

At block 517 the noise level can be estimated using the level differences obtained at block 515. This estimation of the noise level is more precise than the primary estimation of the noise amount because the level difference used to estimate the noise level indicates the level differences between the respective microphone signals that is caused by the incoherent noise. The level difference caused by other characteristics such as the geometry of the device 101 have been accounted for by the adjustment of the microphone levels.

Once the noise level has been estimated then, at block 519, noise reduction can be applied. The noise reduction can be any suitable noise reduction method, or combination of noise reduction methods. An example method would be to choose the microphone 103 with the lowest incoherent noise levels and use the signals from than microphone 103. Another method would be to attenuate the loudest microphones 103 by the estimated noise levels.

Once the noise reduction has been applied the signals can be converted back to the time domain and a noise reduced signal can be provided as an output at block 521.

In examples of the disclosure it can be assumed that the quietest microphone has no incoherent noise or has very low levels of incoherent noise. In some cases, this assumption might not be correct. However, if there are more than two microphones 103 in the device 101 different pairs of microphone signals 401 can be used so that the assumption becomes more accurate.

Examples of the disclosure therefore help to reduce the risk that a suboptimal noise reduction process is used. For example, it can help to reduce the risk that a suboptimal microphone 103 is selected for use due to the level difference caused by shadowing or other physical characteristics.

Figure 6:
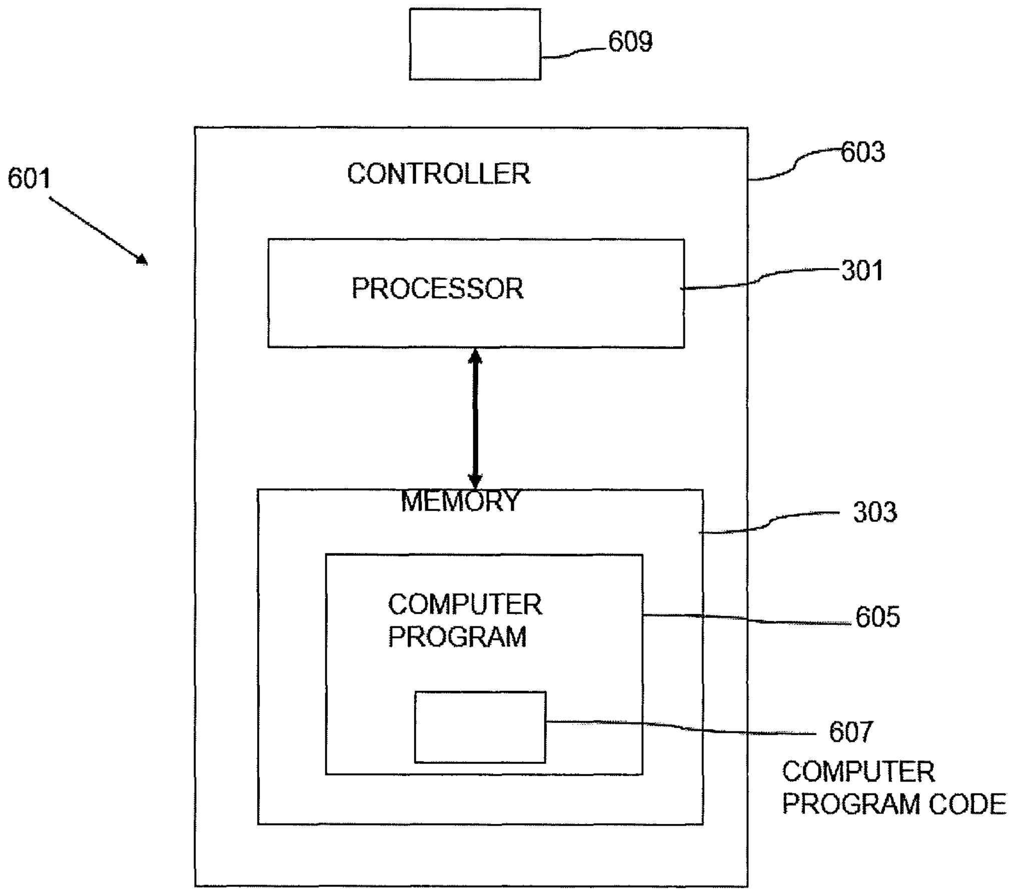
FIG. 6 shows an example apparatus.

FIG. 6 schematically illustrates an apparatus 601 that can be used to implement examples of the disclosure. In this example the apparatus 601 comprises a controller 603. The controller 603 can be a chip or a chip-set. In some examples the controller 703 can be provided within a device comprising two or more microphones 103 such as a communications device or any other suitable type of device 101.

In the example of FIG. 6 the implementation of the controller 603 can be as controller circuitry. In some examples the controller 603 can be implemented in hardware alone, have certain aspects in software including firmware alone or can be a combination of hardware and software (including firmware).

As illustrated in FIG. 6 the controller 603 can be implemented using instructions that enable hardware functionality, for example, by using executable instructions of a computer program 605 in a general-purpose or special-purpose processor 301 that can be stored on a computer readable storage medium (disk, memory etc.) to be executed by such a processor 301.

The processor 301 is configured to read from and write to the memory 303. The processor 301 can also comprise an output interface via which data and/or commands are output by the processor 301 and an input interface via which data and/or commands are input to the processor 301.

The memory 303 is configured to store a computer program 605 comprising computer program instructions (computer program code 607) that controls the operation of the controller 603 when loaded into the processor 301. The computer program instructions, of the computer program 605, provide the logic and routines that enables the controller 603 to perform the methods illustrated in FIGS. 2 and 4 or any other suitable methods. The processor 301 by reading the memory 303 is able to load and execute the computer program 605.

The apparatus 601 therefore comprises: at least one processor 301; and at least one memory 303 including computer program code 607, the at least one memory 303 storing instructions 607 that, when executed by the at least one processor 301, cause the apparatus 601 at least to perform:

- making a primary estimation of a noise amount;
- using at least the primary estimation of a noise amount to determine a direction parameter and a diffuseness parameter;
- using the determined direction parameter and diffuseness parameter to estimate a predicted level difference between a first microphone signal and a second microphone signal;
- determining a level difference between the first microphone signal and the second microphone signal; and
- estimating a noise level using at least the determined level difference and the predicted level difference.

As illustrated in FIG. 6 the computer program 605 can arrive at the controller 603 via any suitable delivery mechanism 609. The delivery mechanism 609 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 605. The delivery mechanism can be a signal configured to reliably transfer the computer program 605. The controller 603 can propagate or transmit the computer program 605 as a computer data signal. In some examples the computer program 605 can be transmitted to the controller 603 using a wireless protocol such as Bluetooth, Bluetooth Low Energy, Bluetooth Smart, 6LoWPan ($IP_v6$ over low power personal area networks) Zig Bee, ANT+, near field communication (NFC), Radio frequency identification, wireless local area network (wireless LAN) or any other suitable protocol.

The computer program 605 comprises computer program instructions for causing an apparatus 601 to perform at least the following:

making a primary estimation of a noise amount;

using at least the primary estimation of a noise amount to determine a direction parameter and a diffuseness parameter;

using the determined direction parameter and diffuseness parameter to estimate a predicted level difference between a first microphone signal and a second microphone signal;

determining a level difference between the first microphone signal and the second microphone signal; and estimating a noise level using at least the determined level difference and the predicted level difference.

The computer program instructions can be comprised in a computer program 605, a non-transitory computer readable medium, a computer program product, a machine readable medium. In some but not necessarily all examples, the computer program instructions can be distributed over more than one computer program 605.

Although the memory 303 is illustrated as a single component/circuitry it can be implemented as one or more separate components/circuitry some or all of which can be integrated/removable and/or can provide permanent/semi-permanent/dynamic/cached storage.

Although the processor 301 is illustrated as a single component/circuitry it can be implemented as one or more separate components/circuitry some or all of which can be integrated/removable. The processor 301 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The apparatus 601 as shown in FIG. 6 can be provided within any suitable device 101. In some examples the apparatus 601 can be provided within an electronic device such as a mobile telephone, a teleconferencing device, a camera, a computing device or any other suitable device. In some examples the apparatus is the device or is an electronic device such as a mobile telephone, a teleconferencing device, a camera, a computing device or any other suitable device.

The blocks illustrated in FIGS. 2 and 4 can represent steps in a method and/or sections of code in the computer program 605. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:

at least one processor; and at least one memory storing instructions that, when executed with the at least one processor, cause the apparatus at least to:

make a primary estimation of a noise amount;

use at least the primary estimation of a noise amount to determine a direction parameter and a diffuseness parameter;

use the determined direction parameter and diffuseness parameter to estimate a predicted level difference between a first microphone signal and a second microphone signal;

determine a level difference between the first microphone signal and the second microphone signal;

estimate a noise level using at least the determined level difference and the predicted level difference; and process the first microphone signal and the second microphone signal to reduce noise levels based on the estimated noise level.

2. An apparatus as claimed in claim 1, wherein the instructions, when executed with the at least one processor, cause the apparatus to select a process to use for determining the direction parameter and the diffuseness parameter.

3. An apparatus as claimed in claim 2, wherein the instructions, when executed with the at least one processor, cause the apparatus to estimate the direction parameter and the diffuseness parameter if the primary estimation of the noise amount is below a lower threshold.

4. An apparatus as claimed in claim 2, wherein the instructions, when executed with the at least one processor, cause the apparatus to estimate the direction parameter and use a recent estimation of the diffuseness parameter if the primary estimation of the noise amount is above a lower threshold but below an upper threshold.

5. An apparatus as claimed in claim 2, wherein the instructions, when executed with the at least one processor, cause the apparatus to use a predetermined direction parameter and a recent estimation of the diffuseness parameter if the primary estimation of the noise amount is above an upper threshold.

6. An apparatus as claimed in claim 5, wherein the predetermined direction is determined based upon a use case of a device comprising the microphones.

7. An apparatus as claimed in claim 1, wherein the instructions, when executed with the at least one processor, cause the apparatus to use information relating to a reference noise level for a device comprising the microphones to determine the predicted level difference.

8. An apparatus as claimed in claim 1 wherein the instructions, when executed with the at least one processor, cause the apparatus to estimate the noise level with adjusting a microphone signal level based on the determined level difference and comparing the adjusted microphone signal level to one or more other microphone signal levels.

9. An apparatus as claimed in claim 1 wherein the diffuseness parameter comprises a ratio of direct audio and ambient audio.

10. An apparatus as claimed in claim 1, wherein the noise comprises incoherent noise.

11. A method, comprising:

making a primary estimation of a noise amount;

using at least the primary estimation of a noise amount to determine a direction parameter and a diffuseness parameter;

using the determined direction parameter and diffuseness parameter to estimate a predicted level difference between a first microphone signal and a second microphone signal;

determining a level difference between the first microphone signal and the second microphone signal;

estimating a noise level using at least the determined level difference and the predicted level difference; and processing the first microphone signal and the second microphone signal to reduce noise levels based on the estimated noise level.

12. A method as claimed in claim 11, wherein using at least the primary estimation of the noise amount to determine the direction parameter and the diffuseness parameter comprises selecting a process to use for determining the direction parameter and the diffuseness parameter.

13. A method as claimed in claim 12, wherein determining the direction parameter and the diffuseness parameter comprises estimating the direction parameter and the diffuseness parameter if the primary estimation of the noise amount is below a lower threshold.

14. A method as claimed in claim 12, wherein determining the direction parameter and the diffuseness parameter comprises estimating the direction parameter and using a recent estimation of the diffuseness parameter if the primary estimation of the noise amount is above a lower threshold but below an upper threshold.

15. A method as claimed in claim 12, further comprising using a predetermined direction parameter and a recent estimation of the diffuseness parameter if the primary estimation of the noise amount is above an upper threshold.

16. A method as claimed in claim 15, wherein the predetermined direction is determined based upon a use case of a device comprising the microphones.

17. A method as claimed in claim 11, wherein the method comprises using information relating to a reference noise level for a device comprising the microphones to determine the predicted level difference.

18. A method as claimed in claim 11, wherein the noise level is estimated with adjusting a microphone signal level based on the determined level difference and comparing the adjusted microphone signal level to one or more other microphone signal levels.

19. A method as claimed in claim 11, wherein the diffuseness parameter comprises a ratio of direct audio and ambient audio.

20. A method as claimed in claim 11, wherein the noise comprises incoherent noise.

* * * * *